United States Patent
Wang

(10) Patent No.: US 12,028,932 B2
(45) Date of Patent: Jul. 2, 2024

(54) COMMUNICATION SERVICE TRANSMISSION METHOD AND APPARATUS, STORAGE MEDIUM AND ELECTRONIC APPARATUS

(71) Applicant: XI'AN ZHONGXING NEW SOFTWARE CO. LTD., Shaanxi (CN)

(72) Inventor: Cheng Wang, Guangdong (CN)

(73) Assignee: XI'AN ZHONGXING NEW SOFTWARE CO. LTD., Shaanxi (CN)

( * ) Notice: Subject to any disclaimer, the term of this patent is extended or adjusted under 35 U.S.C. 154(b) by 423 days.

(21) Appl. No.: 17/295,131

(22) PCT Filed: Dec. 16, 2019

(86) PCT No.: PCT/CN2019/125659
§ 371 (c)(1),
(2) Date: May 19, 2021

(87) PCT Pub. No.: WO2020/125583
PCT Pub. Date: Jun. 25, 2020

(65) Prior Publication Data
US 2022/0007171 A1    Jan. 6, 2022

(30) Foreign Application Priority Data

Dec. 17, 2018   (CN) .......................... 201811545172.1

(51) Int. Cl.
*H04W 8/00* (2009.01)
*H04W 8/18* (2009.01)
*H04W 88/06* (2009.01)

(52) U.S. Cl.
CPC ............ *H04W 8/183* (2013.01); *H04W 88/06* (2013.01)

(58) Field of Classification Search
CPC .............................. H04W 8/183; H04W 88/06
See application file for complete search history.

(56) References Cited

U.S. PATENT DOCUMENTS

2013/0196628 A1    8/2013   Wei et al.
2015/0094071 A1    4/2015   Hang
(Continued)

FOREIGN PATENT DOCUMENTS

CN    105516635 A    4/2016
CN    105611584 A    5/2016
(Continued)

OTHER PUBLICATIONS

China Patent Office, CN201811545172.1 First Office Action issued on Mar. 22, 2022.
(Continued)

*Primary Examiner* — Erika A Washington
(74) *Attorney, Agent, or Firm* — Li & Cai Intellectual Property (USA) Office

(57) ABSTRACT

Provided are a communication service transmission method and apparatus, a storage medium and an electronic apparatus. The method is applicable to a terminal in which a first identity identification module and a second identity identification module are installed. The method includes: transmitting, through a data link corresponding to the second identity identification module, service data of a communication service performed by the first identity identification module.

18 Claims, 6 Drawing Sheets

---

Establish an internal local area network in the terminal, in which the internal local area network is configured to transmit the service data between a service port of the communication service and a device port of the data link corresponding to the second identity identification module in the terminal  — S302

↓

Transmit service data of the communication service performed by the first identity identification module through the data link corresponding to the second identity identification module  — S202

(56)  References Cited

U.S. PATENT DOCUMENTS

| | | | |
|---|---|---|---|
| 2016/0014579 A1* | 1/2016 | Kasilya Sudarsan | ........................ H04W 76/15 455/553.1 |
| 2016/0044178 A1* | 2/2016 | Narayanaswamy | .... H04W 4/16 455/417 |
| 2017/0048773 A1* | 2/2017 | Miao | .................... H04B 1/3816 |
| 2017/0118255 A1 | 4/2017 | Tsai | |
| 2018/0160293 A1* | 6/2018 | Ni | ......................... H04W 8/183 |
| 2018/0213392 A1 | 7/2018 | Ni | |
| 2019/0306898 A1 | 10/2019 | Goddeti et al. | |

FOREIGN PATENT DOCUMENTS

| | | |
|---|---|---|
| CN | 106658630 A | 5/2017 |
| CN | 107395606 A | 11/2017 |
| CN | 108347724 A | 7/2018 |
| CN | 108924887 A | 11/2018 |
| WO | WO 2017136959 A1 | 8/2017 |

OTHER PUBLICATIONS

WIPO, International Search Report issued on Feb. 15, 2020.
European Patent Office, EP19899194.5 Extended European Search Report issued on Jul. 13, 2022.
European Patent Office, EP19899194.5 First Office Action issued on Apr. 25, 2024.

* cited by examiner

COMMUNICATION SERVICE TRANSMISSION METHOD AND APPARATUS, STORAGE MEDIUM AND ELECTRONIC APPARATUS

CROSS-REFERENCE TO RELATED APPLICATIONS

This is a National Phase application filed under 35 U.S.C. 371 as a national stage of PCT/CN2019/125659, filed on Dec. 16, 2019, an application claiming the priority of Chinese Patent Application No. 201811545172.1, filed on Dec. 17, 2018, the contents of which are incorporated herein in their entirety by reference.

TECHNICAL FIELD

The present disclosure relates to, but not limited to, the field of communications, and particularly relates to a communication service transmission method and apparatus, a storage medium and an electronic apparatus.

BACKGROUND

With the popularization and development of terminals supporting IP Multimedia Subsystem (IMS)/Voice over LTE (VoLTE), current higher-level terminal chip schemes have already supported dual-VoLTE+dual-4G+dual-card dual-standby single-communication, and in the future, dual-VoLTE+dual-5G+dual-card dual-standby single-communication may be supported. That is, a user may insert two Universal Subscriber Identity Module (USIM) cards subscribed to VoLTE into a terminal, and may select one of the cards for VoLTE calling while the other card still resides on a 4G or 5G network.

Although the technical scheme of dual-VoLTE+dual-4G or dual-VoLTE+dual-5G improves wireless performance of the terminal, current terminals have no difference from the previous single-card single-standby VoLTE terminal or 4G+2G dual-card dual-standby schemes in terms of implementation of communication services performed thereon, and still have defects of low flexibility in service processing flexibility and low utilization rate of network transmission resources. In addition to the VoLTE service, other types of communication services also face the same problem.

SUMMARY

Embodiments of the present disclosure provide a communication service transmission method and apparatus, a storage medium and an electronic apparatus, which at least solve the problem in the related art that when a communication service is carried out in a dual-card dual-standby communication terminal, the communication service is completely implemented through a card related to the communication service, resulting in low service processing flexibility and low utilization rate of network transmission resources.

According to an embodiment of the disclosure, there is provided a communication service transmission method, which is applicable to a terminal including a plurality of identity identification modules, the plurality of identity identification modules including a first identity identification module and a second identity identification module, and the method including: transmitting, through a data link corresponding to the second identity identification module, service data of a communication service performed by the first identity identification module.

According to another embodiment of the disclosure, there is further provided a communication service transmission apparatus, which is applicable to a terminal including a plurality of identity identification modules, the plurality of identity identification modules including a first identity identification module and a second identity identification module, and the apparatus including: a transmission module configured to transmit service data of a communication service performed by the first identity identification module through a data link corresponding to the second identity identification module.

According to still another embodiment of the disclosure, there is further provided a storage medium having a computer program stored thereon, in which the computer program is configured to be executed to cause steps of the above method embodiment to be implemented.

According to still another embodiment of the disclosure, there is further provided an electronic apparatus, including a memory having a computer program stored thereon and a processor configured to execute the computer program to perform steps of the above method embodiment.

BRIEF DESCRIPTION OF THE DRAWINGS

The drawings described herein are intended to provide a further understanding of the present disclosure, and are intended to be a part of the present disclosure. The exemplary embodiments of the present disclosure and the description thereof are for explaining the present disclosure and do not constitute an undue limitation of the present disclosure. In the drawings.

DETAILED DESCRIPTION

Figure 1:
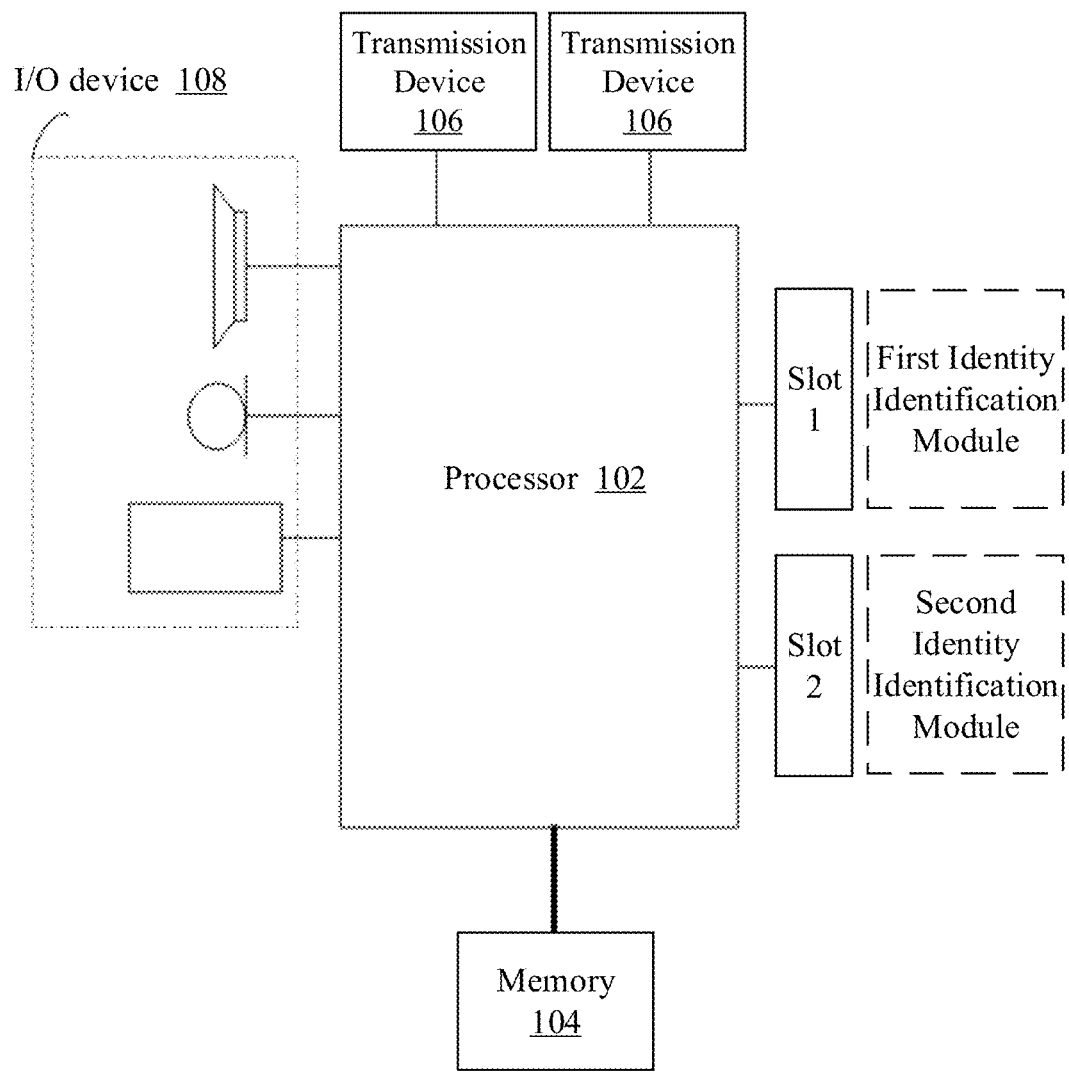
FIG. 1 is a block diagram of hardware structure of a mobile terminal used in a communication service transmission method.

Current terminals have already realized dual-VoLTE+dual-4G or dual-VoLTE+dual-5G, and with the development of technologies, more kinds of dual-card dual-standby terminals will be implemented in the future. A dual-card dual-standby terminal can carry out different communication services on different operators simultaneously. Taking dual-VoLTE+dual-4G or dual-VoLTE+dual-5G as an example, at the same time, one card in the terminal can carry out VoLTE calling, while the other card still resides on a 4G or 5G network of the other operator.

However, due to the limited network deployment capability of a single operator, it may be not possible to guarantee that every area has good network coverage, or guarantee that a base station in an area with a concentrated people flow has sufficient service capability, leading to that VoLTE calling cannot maintain a high quality and high stability in real time, especially for a moving terminal device. In addition to the VoLTE service, other types of communication services also face the same problem. When one of the cards in the dual-card dual-standby communication terminal is used for a communication service, the communication quality and stability of the communication service are only related to the used card and the network environment of the operator the card belong to, and may still degrade with changes in the actual environment. Thus, the presence of the two cards does not bring any improvement to the communication quality of the communication service compared with the previous single-card single-standby VoLTE terminal or 4G+2G dual-card dual-standby scheme.

Considering the advantage of dual-network of the dual-card dual-standby terminal, for example, current dual-card dual-standby terminals already or about to have dual-VoLTE+dual-4G or dual-VoLTE+dual-5G capability, a strong wireless performance of the terminal may be considered to be used for improving the stability of the VoLTE calling. Embodiments of the present disclosure provide a solution for improving service processing and the utilization rate of network transmission resources, and in some embodiments, this solution can improve the communication quality of a communication service with minimum cost, and realize objects of improving quality and stability of the VoLTE calling, improving RCS service quality and the like. The solution of the embodiments of the disclosure is based on a terminal provided with a first identity identification module and a second identity identification module, such as a dual-VoLTE+dual-4G or dual-VoLTE+dual-5G smart terminal (which may be a dual-card dual-standby single-communication terminal or a dual-card dual-standby dual-communication terminal). In the solution provided in the embodiments of the disclosure, service data of the communication service performed by the first identity identification module is transmitted through a data link corresponding to the second identity identification module, and thus the communication service performed by the first identity identification module can be carried out by means of the data link of the second identity identification module. This solution involves only changes in a transmission mode of service data within the terminal, and does not require an operator to modify the base station or core network, such as adding public and private networks by the operator, or require two operators to sign an interoperable roaming protocol that increases complexity of the billing algorithm. The communication quality and stability of the communication service in the terminal can be greatly improved by merely adding or modifying the implementation on the terminal.

The disclosure will be described in detail below with reference to the drawings in conjunction with the embodiments. It should be noted that the embodiments of the disclosure and features therein may be combined with each other in any manner as long as they are not contradictory.

It should be also noted that terms "first", "second", and the like in the description, claims and drawings of the disclosure are used for distinguishing similar objects instead of indicating a specific order or sequence. In the present disclosure, "a plurality" may be two or more.

The method provided in the embodiments of the present application may be executed in a mobile terminal. FIG. 1 is a block diagram of hardware structure of a mobile terminal used in a communication service transmission method. As shown in FIG. 1, a mobile terminal may include one or more (only one is shown in FIG. 1) processors 102 (which may include, but not limited to, processing device such as micro processor unit (MCU), programmable logic device FPGA and the like), and a memory 104 configured to store data. The mobile terminal may further include a transmission device 106 for communication functions (including, in the embodiment of the present disclosure, a transmission device 106 corresponding to the first identity identification module, and a transmission device 106 corresponding to the second identity identification module), an I/O device 108, and card slots 1 and 2 for installing the identity identification modules, (two card slots are shown, but actually, there may be only one or no card slot due to the presence of eSIM). It will be understood by those ordinary skilled in the art that the structure shown in FIG. 1 is merely illustrative, and does not form any limitation to the structure of the above mobile terminal. For example, the mobile terminal may include more or fewer components than those shown in FIG. 1, or have a different configuration than that shown in FIG. 1.

The memory 104 may be configured to store a computer program, for example, a software program and a module of application, such as a computer program corresponding to the communication service transmission method in the embodiments of the present disclosure, and the processor 102 executes the computer program stored in the memory 104 to perform various functions and data processing, that is, implement the above method. The memory 104 may include a high speed random access memory and may also include a non-volatile memory such as one or more magnetic storage device, flash memory, or other non-volatile solid state memory. In some examples, the memory 104 may further include a memory remotely located relative to the processor 102, which may be connected to the mobile terminal over a network. Examples of such networks include, but not limited to, the Internet, intranets, local area networks, mobile communication networks, and combinations thereof.

The transmission device 106 is configured to receive or transmit data over a network. The transmission device 106 in the embodiment of the present disclosure may include a transmission device 106 corresponding to the first identity identification module, and a transmission device 106 corresponding to the second identity identification module. Specific example of such network may include a wireless network provided by a communication provider of the mobile terminal. For a dual-card dual-standby terminal, different transmission devices 106 may correspond to different networks. In an example, the transmission device 106 includes a Network Interface Controller (NIC) that may be connected to another network device through a base station to communicate with the Internet. In an example, the transmission device 106 may be a Radio Frequency (RF) module configured to communicate with the Internet wirelessly.

Figure 2:
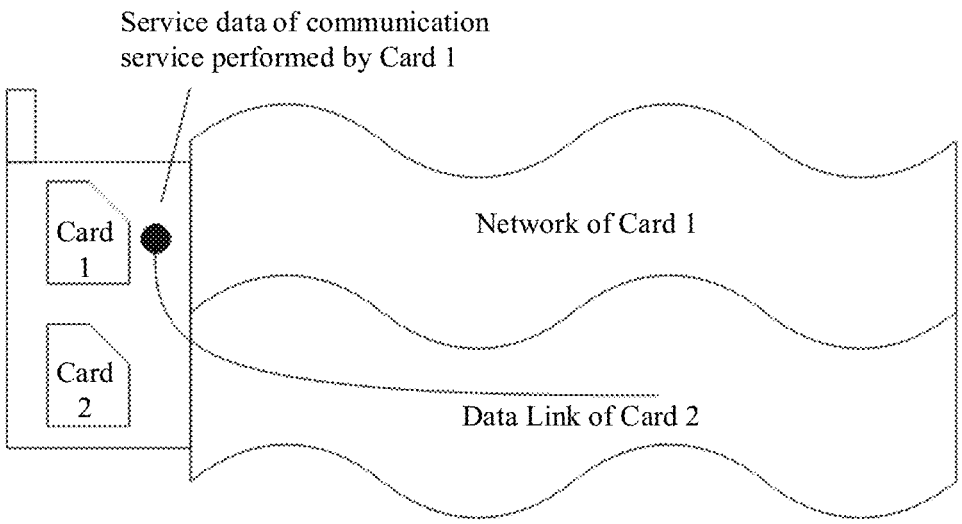
FIG. 2 is a schematic diagram of a communication service transmission method.
Figure 3:
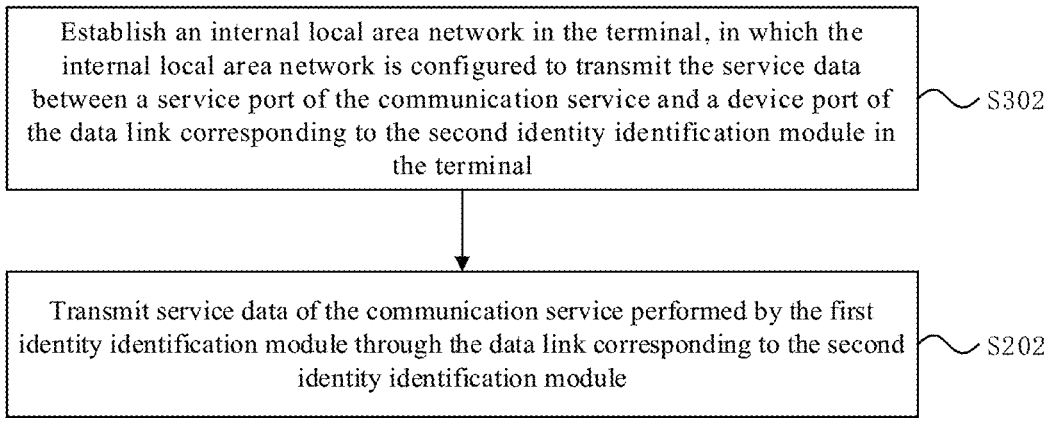
FIG. 3 is a first optional flowchart of a communication service transmission method.

In the present embodiment, there is provided a communication service transmission method operated on the above mobile terminal and applicable to a terminal including a first identity identification module and a second identity identification module. It should be noted that the terminal may include other identity identification modules besides the first identity identification module and the second identity identification module, and the present embodiment does not exclude a solution including more identity identification modules. FIG. 2 is a schematic diagram of a communication service transmission method. In FIG. 2, card 1 refers to the first identity identification module, and card 2 refers to the second identity identification module. As shown in FIGS. 2 and 3, the communication service transmission method includes the step S202: transmitting, through a data link corresponding to the second identity identification module, service data of a communication service performed by the first identity identification module.

It should be noted that in the above embodiment, the communication service may be a communication service related to the first identity identification module (e.g., a degree of relevance higher than a predetermined degree). For example, the communication service may be an additional communication service or a value-added service provided for the first identity identification module. It should be understood by those skilled in the art that this solution is applicable to all the communication services whose data can be transmitted through the data link corresponding to the second identity identification module. In an exemplary embodiment of the present disclosure, the communication service is exemplified by a VoLTE service or a Rich Communication Suite (RCS) service, but it should not be interpreted as being limited to these two types of services.

Through the above step, in the terminal including the first identity identification module and the second identity identification module, the service data of the communication service performed by the first identity identification module is transmitted through the data link corresponding to the second identity identification module. That is, for the communication service performed by the first identity identification module, transmission of the service data can be carried out by means of the data link of the second identity identification module, which improves the flexibility of service processing and fully utilizes network transmission resources. This solution solves the problem in the related art that when a communication service is carried out in a dual-card dual-standby communication terminal, the communication service can only be implemented completely through a card related to the communication service, resulting in low service processing flexibility and low utilization rate of network transmission resources, increases the maximum utilization rate of the terminal to wireless networks of different network operators, and notably improves the user experience.

In an embodiment, the executor of the above steps may be a terminal, but not limited thereto.

When implementing different network communications corresponding to different identity identification modules in the terminal, different ports are often provided in the terminal so that data transmitted to different communication networks or by different transmission modes can be sent out through respective dedicated ports. Therefore, as shown in the first optional flowchart of a communication service transmission method in FIG. 3, in order to cooperate with such implementation manner of some terminals, before the step S202, i.e., transmitting, through the data link corresponding to the second identity identification module, service data of the communication service performed by the first identity identification module, the method of the embodiment of the disclosure further includes step S302: establishing an internal local area network in the terminal, in which the internal local area network is configured to transmit the service data between a service port of the communication service and a device port of the data link corresponding to the second identity identification module in the terminal.

As an exemplary embodiment, establishing the internal local area network in the terminal may be implemented by: establishing a dedicated routing rule between the service port of the communication service and the device port of the data link corresponding to the second identity identification module in the terminal. The dedicated routing rule includes at least one of: the service data transmitted from the service port of the communication service is routed to the device port of the data link corresponding to the second identity identification module; and the service data, belonging to the communication service and received from the data link through the device port of the data link corresponding to the second identity identification module, is routed to the service port of the communication service.

That is, the dedicated routing rule needs to ensure a bidirectional routing between the service port of the communication service and the device port of the data link corresponding to the second identity identification module in the terminal, so that the service data, which should be sent to a device port corresponding to the first identity identification module, is routed to the device port of the data link corresponding to the second identity identification module, and the service data of the communication service, which is received at the device port from the data link, is returned to the service port of the communication service. Based on the dedicated routing rule, the internal local area network transmits the service data between the service port of the communication service and the device port of the data link corresponding to the second identity identification module in the terminal. In this way, it is convenient to implement the step S202, i.e., transmitting, through the data link corresponding to the second identity identification module, service data of the communication service performed by the first identity identification module. Since the service data of the communication service can be routed to the device port of the data link corresponding to the second identity identification module according to the dedicated routing rule, the service data of the communication service may be directly sent to the data link corresponding to the second identity identification module and transmitted therein, finally reaching a core network element in the network for processing the communication service, and vice versa. From the user's point of view, the user may use the terminal for high-quality and high-reliability communication services smoothly without blockage and without perception of changes in internal implementation of the terminal. In addition, this solution does not need to change the structure and protocol at the network side, and thus is a very convenient and simple implementation manner.

The following describes the method provided in exemplary embodiments of the present disclosure in detail from the aspects of sending and receiving service data, respectively. The step S202, i.e., transmitting, through the data link corresponding to the second identity identification module, service data of the communication service performed by the first identity identification module, may include at least one of a sending service data step and a receiving service data step. The sending service data step and the receiving service data step will be explained in detail below, respectively. The sending service data step specifically includes: transmitting, over the internal local area network, the service data transmitted from the service port of the communication service to the device port of the data link corresponding to the second identity identification module, and sending, through the data link at the device port, the service data to a core network element for implementing the communication service in a first network corresponding to the first identity identification module.

In an exemplary embodiment of the present disclosure, the step of sending, through the data link at the device port, the service data to the core network element for implementing the communication service in the first network corresponding to the first identity identification module, may include: sending, at the device port, a first data packet through the data link corresponding to the second identity identification module, in which the first data packet carries the service data, and a destination address of the first data packet is configured as an address of the core network element.

In order to distinguish different service modules within the terminal, the service port of the communication service may be allocated with an internal address in the terminal, so that a source of a data packet can be known and different routing and service processing can be performed according to different sources. Therefore, in an exemplary embodiment of the present disclosure, a source address of the first data packet upon generation at the service port of the communication service is configured as an address allocated by the internal local area network to the communication service performed by the first identity identification module (which is referred to as an internal address and may include an internal IP address and a port number). According to the internal address, it can be known that the source is the service port of the communication service, and according to the dedicated routing rule, the data packet will be routed to the device port of the data link corresponding to the second identity identification module. However, before sending the data packet at the device port of the data link, in order to facilitate a device external to the terminal, such as an access network and a core network element, to identify the source of the data packet and the service to which the data packet belongs, an optional embodiment is to replace the internal address configured in the source address with an address allocated by the first network to the communication service performed by the first identity identification module (which is referred to as an external address and may include a communication service IP address and a port number, such as a VoLTE or RCS service IP address and port number). That is, before sending, at the device port, the first data packet through the data link corresponding to the second identity identification module, the step of sending, through the data link at the device port, the service data to the core network element for implementing the communication service in the first network corresponding to the first identity identification module may further include: replacing a source address of the first data packet being an address allocated by the internal local area network to the communication service performed by the first identity identification module with an address allocated by the first network to the communication service performed by the first identity identification module.

Apparently, the present disclosure is not limited thereto. Optionally, the step of sending, through the data link at the device port, the service data to the core network element for implementing the communication service in the first network corresponding to the first identity identification module may include: sending, at the device port, a second data packet through the data link corresponding to the second identity identification module, in which the second data packet carries the service data, and a destination address of the second data packet is configured as an address of a pre-gateway of the core network element in the first network; and establishing, after the pre-gateway receives the second data packet, a tunnel between the pre-gateway and the core network element, through which the second data packet is sent to the core network element.

In order to distinguish different service modules within the terminal, the service port of the communication service may be allocated with an internal address in the terminal, so that a source of a data packet can be known and different routing and service processing can be performed according to different sources. Therefore, in an exemplary embodiment of the present disclosure, a source address of the second data packet upon generation at the service port of the communication service is configured as an address allocated by the internal local area network to the communication service performed by the first identity identification module (which is referred to as an internal address and may include an internal IP address and a port number). According to the internal address, it can be known that the source is the service port of the communication service, and according to the dedicated routing rule, the data packet will be routed to the device port of the data link corresponding to the second identity identification module. However, before sending the data packet at the device port of the data link, in order to facilitate a device external to the terminal, such as an access network and a core network element, to identify the source of the data packet and the service to which the data packet belongs, an optional embodiment is to replace the internal address configured in the source address with an address allocated by the first network to the communication service performed by the first identity identification module (which is referred to as an external address and may include a communication service IP address and a port number, such as a VoLTE or RCS service IP address and port number). That is, before sending, at the device port, the second data packet through the data link corresponding to the second identity identification module, the step of sending, through the data link at the device port, the service data to the core network element for implementing the communication service in the first network corresponding to the first identity identification module may further include: replacing a source address of the second data packet being an address allocated by the internal local area network to the communication service performed by the first identity identification module with an address allocated by the first network to the communication service performed by the first identity identification module.

The receiving service data step specifically includes: receiving, at the device port of the data link corresponding to the second identity identification module, the service data sent from a core network element for implementing the communication service in the first network corresponding to the first identity identification module through the data link, and transmitting, over the internal local area network, the service data from the device port to the service port of the communication service.

In an exemplary embodiment of the present disclosure, the step of receiving, at the device port of the data link corresponding to the second identity identification module, the service data sent from the core network element for implementing the communication service in the first network corresponding to the first identity identification module through the data link may include: receiving, at the device port, a third data packet sent from the core network element for implementing the communication service in the first network through the data link, in which the third data packet carries the service data, and a destination address of the third data packet is an address allocated by the first network to the communication service performed by the first identity identification module (which is referred to as an external address and may include a communication service IP address and a port number, such as a VoLTE or RCS service IP address and port number).

Through the above solution, after receiving the data packet from the data link corresponding to the second identity identification module, the internal local area network may, according the address allocated by the first network to the communication service performed by the first identity identification module, extract the third data packet of the communication service sent to the first identity identification module from the core network element/pre-gateway of the core network element of the first network from all the received internet data, and further replace the destination address of the third data packet being the address allocated by the first network to the communication service performed by the first identity identification module (which is referred to as an external address and may include an external IP address and a port number) with an address allocated by the internal local area network to the communication service performed by the first identity identification module (which is referred to as an internal address and may include an internal IP address and a port number). Then, according to the dedicated routing rule, the data packet may be routed from the device port of the data link corresponding to the second identity identification module to the service port of the communication service. It is advised to shield invalid data sent to other modules or ports during this process, so as to avoid the invalid data from being sent to the service port of the communication service and influencing the normal communication service. Such shielding is especially necessary for some services with stronger real-time performance, such as the VoLTE service.

For VoLTE and RCS services, the core network element may be an Evolved Packet Core (EPC for short, including a 4G network communication core) in a network corresponding to the first identity identification module.

For VoLTE and RCS services, the pre-gateway may be a Packet Data Network Gateway (ePDG) in a network corresponding to the first identity identification module.

It can be understood by combining the above-described solutions that the establishment of the dedicated routing rule is, as a whole, equivalent to establishing a dedicated internal local area network within the terminal, in which the internal local area network is only used for the communication service (e.g. a VoLTE or RCS service) performed by the first identity identification module, and is connected to the Internet through the data link of the second identity identification module. The internal local area network allocates a local area network internal IP address and a port number to the communication service of the first identity identification module. The internal local area network establishes a dedicated routing rule to forward the communication service data of the first identity identification module to the second identity identification module, where the communication service data is sent to the Internet through the data link of the second identity identification module, and then to the ePDG of the first network through the Internet. The internal local area network extracts, from all the received internet data, the communication service data sent to the first identity identification module from the ePDG of the first network, and routes the communication service data to the communication service of the first identity identification module. Before sending the communication service data of the first identity identification module to the Internet, the internal local area network converts the source address (an internal IP address and a port that are allocated to the communication service of the first identity identification module by the internal local area network) in the data into a VoLTE or RCS service IP address and a port that are allocated to the first identity identification module by the first network. After receiving the data sent from the ePDG of the first network to the communication service of the first identity identification module, the internal local area network converts the destination address (a VoLTE or RCS service IP address and a port that are allocated to the first identity identification module by the first network) in the data into an internal IP address and a port that are allocated to the communication service of the first identity identification module by the internal local area network.

Figure 4:
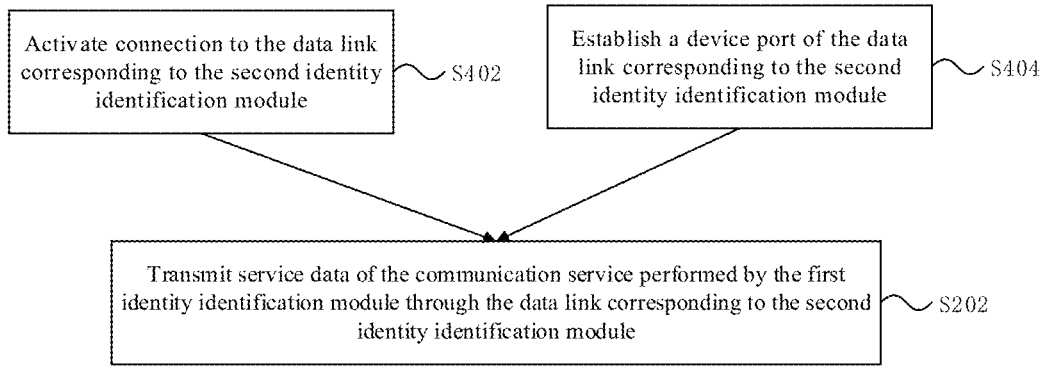
FIG. 4 is a second optional flowchart of a communication service transmission method.

FIG. 4 is a second optional flowchart of a communication service transmission method. As shown in FIG. 4, before the step S202, i.e., transmitting, through the data link corresponding to the second identity identification module, service data of the communication service performed by the first identity identification module, the method further includes at least one of steps S402 and S404.

At step S402, activating connection to the data link corresponding to the second identity identification module.

At step S404, establishing a device port of the data link corresponding to the second identity identification module.

These steps are only optional steps, because in the terminal, the connection to the data link corresponding to the second identity identification module may have already been activated, and/or the device port of the data link corresponding to the second identity identification module may have already been established, in which case, there is no need to perform step S402 and/or step S404 anymore. In addition, the sequence of step S402 and/or step S404 and step S302 is not limited herein. These steps may be performed simultaneously or sequentially, and neither will affect implementation of the present embodiment.

Considering realizing the most reasonable and optimal communication service transmission method in the terminal, and improving the comprehensive utilization efficiency of the network, a predetermined judgment step may be provided to judge whether to apply the solutions in the various embodiments when facing various network transmission choices. Therefore, as an exemplary embodiment, the step S202, i.e., transmitting, through the data link corresponding to the second identity identification module, service data of the communication service performed by the first identity identification module, may be performed only when a predetermined condition is satisfied. The predetermined condition includes at least one of the following conditions.

(1) A communication quality of the communication service performed by the first identity identification module is lower than a first preset communication quality. By this condition, it can be determined that the network corresponding to the original first identity identification module has a poor communication quality when carrying out the communication service, so the data link of the second identity identification module is enabled for service data transmission. In practical applications, it is possible to determine whether the communication quality of the communication service performed by the first identity identification module is lower than the first preset communication quality by determining a relationship between a specific parameter capable of representing the communication quality and a predetermined threshold corresponding to the parameter. Taking the VoLTE or RCS service as an example, it is considered that the quality of the VoLTE calling or RCS service is significantly reduced when one or more of the following indexes satisfy the condition: 1. the received signal is below a threshold criterion; 2. the data rate is below a threshold criterion; 3. the packet loss rate is continuously higher than a threshold for a preset time; and 4. the Real-time Transport Protocol (RTP) packet delay jitter value is continuously higher than a threshold for a preset time.

(2) A signal quality of the second identity identification module is higher than that of the first identity identification module. By this condition, it can be determined that the signal quality of the original first identity identification module is inferior to that of the second identity identification module, so the data link of the second identity identification module is enabled for service data transmission. Comparison of the signal quality of the two identity identification modules may be performed through a general parameter for characterizing the signal quality. For example, the Reference Signal Receiving Power (RSRP) corresponding to each of the first identity identification module and the second identity identification module is compared, and if the RSRP corresponding to the second identity identification module is higher than the RSRP corresponding to the first identity identification module, it is considered that the signal quality of the second identity identification module is higher than that of the first identity identification module.

(3) A network rate of the data link corresponding to the second identity identification module is higher than that of a WiFi network. By this condition, it can be determined that the network rate of the WiFi network in the terminal is lower than the network rate of the data link of the second identity identification module, so the data link of the second identity identification module, instead of Voice over WiFi (also referred to as WFC), is considered to be used for service data transmission. Since the signal qualities of the communication service achieved by the WiFi signal and by the identity identification module cannot be directly compared, the rates of the two can be compared instead, and if the network rate of the data link corresponding to the second identity identification module is higher than that of the WiFi network, the data link of the second identity identification module is selected for service data transmission.

The above conditions may be used alone or in combination. For example, condition (1) may be selected first to determine that the communication quality is poor when the first identity identification module performs the communication service, and then condition (2) may be used to determine whether to use the data link corresponding to the second identity identification module as a substitute or auxiliary for transferring the service data of the communication service; or condition (1) may be selected first to determine that the communication quality is poor when the first identity identification module performs the communication service, and then condition (3) may be used to determine whether to use the data link corresponding to the second identity identification module or the WiFi link as a substitute or auxiliary for transferring the service data of the communication service; or condition (1) may be selected first to determine that the communication quality is poor when the first identity identification module performs the communication service, and then a combination of conditions (2) and (3) may be used to determine whether a substitute or auxiliary service data transmission mode should be enabled, and since the rate of the data link corresponding to the second identity identification module is higher than that of the WiFi link, the data link corresponding to the second identity identification module should be selected as the substitute or auxiliary for transferring the service data of the communication service.

Figure 5:
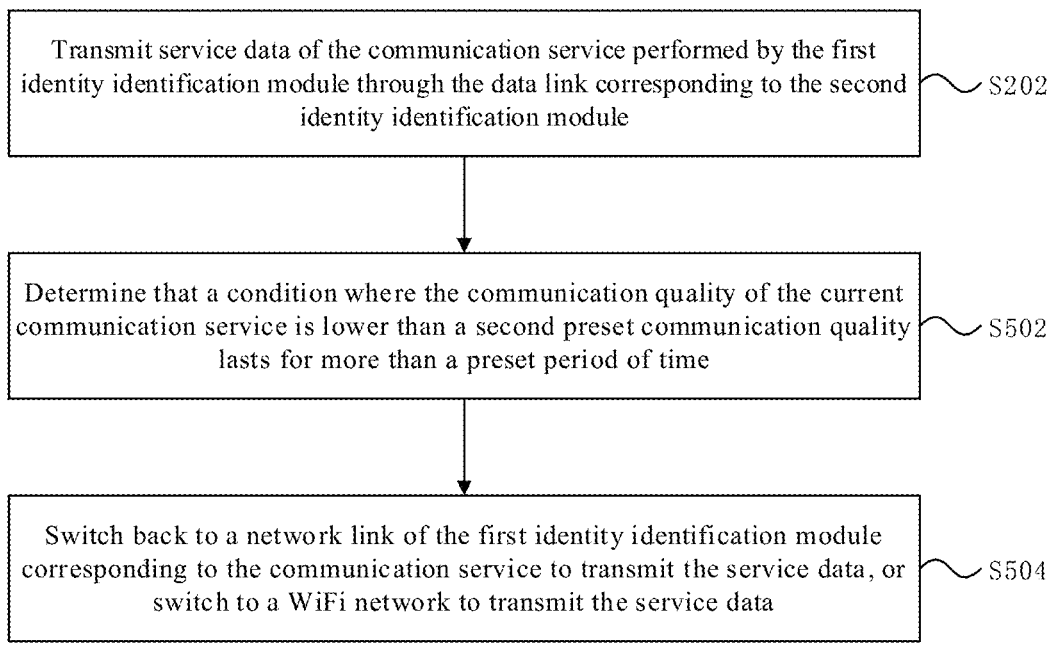
FIG. 5 is a third optional flowchart of a communication service transmission method.

After the data link corresponding to the second identity identification module is used to transmit the service data of the communication service, the communication quality may be monitored in real time, and if the communication quality remains poor for a period of time, it may be considered to switch transmission of the service data of the communication service back to the communication network corresponding to the first identity identification module. FIG. 5 is a third optional flowchart of a communication service transmission method. As shown in FIG. 5, after the step S202, i.e., transmitting, through the data link corresponding to the second identity identification module, service data of the communication service performed by the first identity identification module, the method may further include the following steps S502 and S504.

Step S502 includes determining that a condition where the communication quality of the current communication service is lower than a second preset communication quality lasts for more than a preset period of time. In practical applications, it is possible to determine whether the condition where the communication quality of the current communication service is lower than the second preset communication quality lasts for more than the preset period of time by determining a relationship between a specific parameter capable of representing the communication quality and a predetermined threshold corresponding to the parameter. Taking VoLTE as an example, it is considered that the quality of the VoLTE calling is significantly reduced when one or more of the following indexes satisfy the condition: 1. the received signal is below a threshold criterion; 2. the data rate is below a threshold criterion; 3. the packet loss rate is continuously higher than a threshold for a preset time; and 4. the RTP packet delay jitter value is continuously higher than a threshold for a preset time. The threshold value of each parameter corresponding to the second preset communication quality may be the same as or different from the threshold value of each parameter corresponding to the first preset communication quality.

Step S504 includes switching back to a network link of the first identity identification module corresponding to the communication service to transmit the service data, or switching to a WiFi network to transmit the service data.

Through the description of the above embodiments, those skilled in the art can clearly understand that the method according to the above embodiments may be implemented by means of software plus a necessary general hardware platform. Obviously, it may also be implemented by hardware, but in most cases, the former is preferable. Based on such understanding, the technical solutions of the present disclosure essentially or in other words, a part thereof contributing to the related art, can be embodied in a form of a software product, wherein the software product is stored in a storage medium (such as an ROM/RAM, a disk, or an optical disc) and includes a number of instructions to make a terminal device (which may be a terminal, a computer, a server, or a network device, etc.) to execute the methods of the various embodiments of the present disclosure.

In an embodiment, there is further provided a communication service transmission apparatus configured to implement the above embodiments. Details which have been explained will not be repeated here. As used herein, the term "module" may be a combination of software and/or hardware that can realize a preset function. The devices described in the following embodiments may be implemented in software, and hardware, or a combination of software and hardware, is also possible and contemplated.

Figure 6:
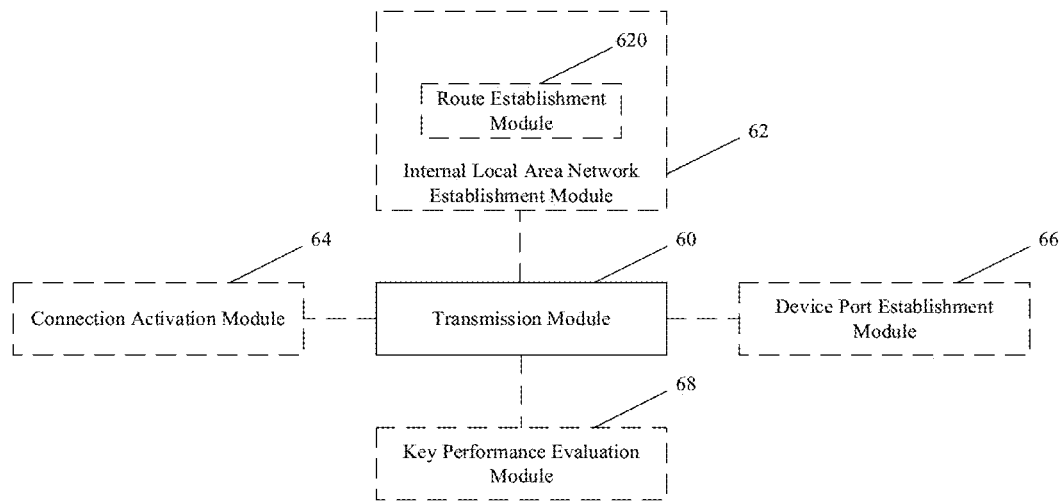
FIG. 6 is a block diagram showing structure of a communication service transmission apparatus.

FIG. 6 is a block diagram showing structure of a communication service transmission apparatus. As shown in FIG. 6, the apparatus is applicable to a terminal in which a first identity identification module and a second identity identification module are installed, and the apparatus may include a transmission module 60.

Specifically, the transmission module 60 is configured to transmit service data of a communication service performed by the first identity identification module through a data link corresponding to the second identity identification module.

It should be noted that in the above embodiment, the communication service may be a communication service related to the first identity identification module (e.g., a degree of relevance higher than a predetermined degree). For example, the communication service may be an additional communication service or a value-added service provided for the first identity identification module. It should be understood by those skilled in the art that all the communication services whose data can be transmitted through the data link corresponding to the second identity identification module may adopt the above apparatus for data transmission. In an exemplary embodiment of the present disclosure, the communication service is exemplified by a VoLTE service or a RCS service, but it should not be interpreted as being limited to these two types of services.

Through the above apparatus, in the terminal including the first identity identification module and the second identity identification module, the service data of the communication service performed by the first identity identification module is transmitted through the data link corresponding to the second identity identification module. That is, for the communication service performed by the first identity identification module, transmission of the service data can be carried out by means of the data link of the second identity identification module, which improves the flexibility of service processing and fully utilizes network transmission resources. This apparatus solves the problem in the related art that when a communication service is carried out in a dual-card dual-standby communication terminal, the communication service can only be implemented completely through a card related to the communication service, resulting in low service processing flexibility and low utilization rate of network transmission resources, increases the maximum utilization rate of the terminal to wireless networks of different network operators, and notably improves the user experience.

When implementing different network communications corresponding to different identity identification modules in the terminal, different ports are often provided in the terminal so that data transmitted to different communication networks or by different transmission modes can be sent out through respective dedicated ports. Therefore, as shown in the block diagram showing structure of the communication service transmission apparatus, in order to cooperate with such implementation manner of some terminals, the apparatus may further include an internal local area network establishment module 62.

Specifically, the internal local area network establishment module 62 is configured to establish an internal local area network in the terminal, in which the internal local area network is configured to transmit the service data between a service port of the communication service and a device port of the data link corresponding to the second identity identification module in the terminal.

As an exemplary embodiment, the internal local area network establishment module 62 may include a route establishment module 620 configured to establish a dedicated routing rule between the service port of the communication service and the device port of the data link corresponding to the second identity identification module in the terminal. The dedicated routing rule includes at least one of: the service data transmitted from the service port of the communication service is routed to the device port of the data link corresponding to the second identity identification module; and the service data, belonging to the communication service and received from the data link through the device port of the data link corresponding to the second identity identification module, is routed to the service port of the communication service.

That is, the dedicated routing rule needs to ensure a bidirectional routing between the service port of the communication service and the device port of the data link corresponding to the second identity identification module in the terminal, so that the service data, which should be sent to a device port corresponding to the first identity identification module, is routed to the device port of the data link corresponding to the second identity identification module, and the service data of the communication service, which is received at the device port from the data link, is returned to the service port of the communication service. Based on the dedicated routing rule, the internal local area network transmits the service data between the service port of the communication service and the device port of the data link corresponding to the second identity identification module in the terminal. In this way, it is convenient for the transmission module 60 to transmit, through the data link corresponding to the second identity identification module, service data of the communication service performed by the first identity identification module. Since the service data of the communication service can be routed to the device port of the data link corresponding to the second identity identification module according to the dedicated routing rule, the service data of the communication service may be directly sent to the data link corresponding to the second identity identification module and transmitted therein, finally reaching a core network element in the network for processing the communication service, and vice versa. From the user's point of view, the user may use the terminal for high-quality and high-reliability communication services smoothly without blockage and without perception of changes in internal implementation of the terminal. In addition, this solution does not need to change the structure and protocol at the network side, and thus is a very convenient and simple implementation manner.

The following describes the apparatus provided in exemplary embodiments of the present disclosure in detail from the aspects of sending and receiving service data, respectively. The transmission module 60 may be further configured to send or receive service data. The operations of sending service data and receiving service data will be explained in detail below, respectively.

(1) Sending service data: transmitting, over the internal local area network, the service data transmitted from the service port of the communication service to the device port of the data link corresponding to the second identity identification module, and sending, through the data link at the device port, the service data to a core network element for implementing the communication service in a first network corresponding to the first identity identification module.

The transmission module 60 may be further configured to send, through the data link at the device port, the service data to the core network element for implementing the communication service in the first network corresponding to the first identity identification module by one of: sending, at the device port, a first data packet through the data link corresponding to the second identity identification module, in which the first data packet carries the service data, and a destination address of the first data packet is configured as an address of the core network element; and sending, at the device port, a second data packet through the data link corresponding to the second identity identification module, in which the second data packet carries the service data, and a destination address of the second data packet is configured as an address of a pre-gateway of the core network element in the first network, so that after receiving the second data packet, the pre-gateway may establish a tunnel between the pre-gateway and the core network element, through which the second data packet is sent to the core network element.

In order to distinguish different service modules within the terminal, the service port of the communication service may be allocated with an internal address in the terminal, so that a source of a data packet can be known and different routing and service processing can be performed according to different sources. Therefore, in an exemplary embodiment of the present disclosure, a source address of the first or second data packet upon generation at the service port of the communication service is configured as an address allocated by the internal local area network to the communication service performed by the first identity identification module (which is referred to as an internal address and may include an internal IP address and a port number). According to the internal address, it can be known that the source is the service port of the communication service, and according to the dedicated routing rule, the data packet will be routed to the device port of the data link corresponding to the second identity identification module. However, before sending the data packet at the device port of the data link, in order to facilitate a device external to the terminal, such as an access network and a core network element, to identify the source of the data packet and the service to which the data packet belongs, an optional embodiment is to replace the internal address configured in the source address with an address allocated by the first network to the communication service performed by the first identity identification module (which is referred to as an external address and may include a communication service IP address and a port number, such as a VoLTE or RCS service IP address and port number). That is, the transmission module 60 is further configured to: before sending, at the device port, the first or second data packet through the data link corresponding to the second identity identification module, replace a source address of the first or second data packet being an address allocated by the internal local area network to the communication service performed by the first identity identification module with an address allocated by the first network to the communication service performed by the first identity identification module.

(2) Receiving service data: receiving, at the device port of the data link corresponding to the second identity identification module, the service data sent from a core network element for implementing the communication service in the first network corresponding to the first identity identification module through the data link, and transmitting, over the internal local area network, the service data from the device port to the service port of the communication service.

In an exemplary embodiment of the present disclosure, the transmission module 60 may be configured to receive, at the device port of the data link corresponding to the second identity identification module, the service data sent from the core network element for implementing the communication service in the first network corresponding to the first identity identification module through the data link by: receiving, at the device port, a third data packet sent from the core network element for implementing the communication service in the first network through the data link, in which the third data packet carries the service data, and a destination address of the third data packet is an address allocated by the first network to the communication service performed by the first identity identification module (which is referred to as an external address and may include a communication service IP address and a port number, such as a VoLTE or RCS service IP address and port number).

Through the above solution, after receiving the data packet from the data link corresponding to the second identity identification module, the internal local area network may, according the address allocated by the first network to the communication service performed by the first identity identification module, extract the third data packet of the communication service sent to the first identity identification module from the core network element/pre-gateway of the core network element of the first network from all the received internet data, and further replace the destination address of the third data packet being the address allocated by the first network to the communication service performed by the first identity identification module (which is referred to as an external address and may include an external IP address and a port number) with an address allocated by the internal local area network to the communication service performed by the first identity identification module (which is referred to as an internal address and may include an internal IP address and a port number). Then, according to the dedicated routing rule, the data packet may be routed from the device port of the data link corresponding to the second identity identification module to the service port of the communication service. It is advised to shield invalid data sent to other modules or ports during this process, so as to avoid the invalid data from being sent to the service port of the communication service and influencing the normal communication service. Such shielding is especially necessary for some services with stronger real-time performance, such as the VoLTE service.

For VoLTE and RCS services, the core network element may be an Evolved Packet Core (EPC for short, including a 4G network communication core) in a network corresponding to the first identity identification module.

For VoLTE and RCS services, the pre-gateway may be a Packet Data Network Gateway (ePDG) in a network corresponding to the first identity identification module.

It can be understood by combining the above-described solutions that the establishment of the dedicated routing rule is, as a whole, equivalent to establishing a dedicated internal local area network within the terminal, in which the internal local area network is only used for the communication service (e.g. a VoLTE or RCS service) performed by the first identity identification module, and is connected to the Internet through the data link of the second identity identification module. The internal local area network allocates a local area network internal IP address and a port number to the communication service of the first identity identification module. The internal local area network establishes a dedicated routing rule to forward the communication service data of the first identity identification module to the second identity identification module, where the communication service data is sent to the Internet through the data link of the second identity identification module, and then to the ePDG of the first network through the Internet. The internal local area network extracts, from all the received internet data, the communication service data sent to the first identity identification module from the ePDG of the first network, and routes the communication service data to the communication service of the first identity identification module. Before sending the communication service data of the first identity identification module to the Internet, the internal local area network converts the source address (an internal IP address and a port that are allocated to the communication service of the first identity identification module by the internal local area network) in the data into a VoLTE or RCS service IP address and a port that are allocated to the first identity identification module by the first network. After receiving the data sent from the ePDG of the first network to the communication service of the first identity identification module, the internal local area network converts the destination address (a VoLTE or RCS service IP address and a port that are allocated to the first identity identification module by the first network) in the data into an internal IP address and a port that are allocated to the communication service of the first identity identification module by the internal local area network.

As shown in the block diagram showing structure of the communication service transmission apparatus, the apparatus may further include at least one of: a connection activation module 64 configured to activate connection to the data link corresponding to the second identity identification module; and a device port establishment module 66 configured to establish a device port of the data link corresponding to the second identity identification module.

Invoking of the above modules are merely optional, because in the terminal, the connection to the data link corresponding to the second identity identification module may have already been activated, and/or the device port of the data link corresponding to the second identity identification module may have already been established. At this time, there is no need to invoke the connection activation module 64 and/or the device port establishment module 66. In addition, the execution sequence of the functional operations of the connection activation module 64 and/or the device port establishment module 66 and the route establishment module 620 is not limited, and these operations may be performed simultaneously or sequentially, and neither will affect implementation of the present embodiment.

Considering realizing the most reasonable and optimal communication service transmission method in the terminal, and improving the comprehensive utilization efficiency of the network, a predetermined judgment step may be provided to judge whether to apply the solutions in the various embodiments when facing various network transmission choices. Therefore, as shown in the block diagram showing structure of the communication service transmission apparatus, the apparatus may further include: a key performance evaluation module 68 configured to judge whether a predetermined condition is satisfied, in which the predetermined condition includes at least one of: a communication quality of the communication service performed by the first identity identification module is lower than a first preset communication quality; a signal quality of the second identity identification module is higher than that of the first identity identification module; and a network rate of the data link corresponding to the second identity identification module is higher than that of a WiFi network.

The transmission module 60 is configured to transmit, under a condition that the key performance evaluation module 68 determines that the predetermined condition is satisfied, service data of the communication service performed by the first identity identification module through the data link corresponding to the second identity identification module.

Each predetermined condition is described in detail below.

(1) The communication quality of the communication service performed by the first identity identification module is lower than the first preset communication quality. By this condition, it can be determined that the network corresponding to the original first identity identification module has a poor communication quality when carrying out the communication service, so the data link of the second identity identification module is enabled for service data transmission. In practical applications, it is possible to determine whether the communication quality of the communication service performed by the first identity identification module is lower than the first preset communication quality by determining a relationship between a specific parameter capable of representing the communication quality and a predetermined threshold corresponding to the parameter. Taking VoLTE as an example, it is considered that the quality of the VoLTE calling is significantly reduced when one or more of the following indexes satisfy the condition: 1. the received signal is below a threshold criterion; 2. the data rate is below a threshold criterion; 3. the packet loss rate is continuously higher than a threshold for a preset time; and 4. the RTP packet delay jitter value is continuously higher than a threshold for a preset time.

(2) The signal quality of the second identity identification module is higher than that of the first identity identification module. By this condition, it can be determined that the signal quality of the original first identity identification module is inferior to that of the second identity identification module, so the data link of the second identity identification module is enabled for service data transmission. Comparison of the signal quality of the two identity identification modules may be performed through a general parameter for characterizing the signal quality. For example, the Reference Signal Receiving Power (RSRP) corresponding to each of the first identity identification module and the second identity identification module is compared, and if the RSRP corresponding to the second identity identification module is higher than the RSRP corresponding to the first identity identification module, it is considered that the signal quality of the second identity identification module is higher than that of the first identity identification module.

(3) The network rate of the data link corresponding to the second identity identification module is higher than that of the WiFi network. By this condition, it can be determined that the network rate of the WiFi network in the terminal is lower than the network rate of the data link of the second identity identification module, so the data link of the second identity identification module, instead of Voice over WiFi (WFC), is considered to be used for service data transmission. Since the signal qualities of the communication service achieved by the WiFi signal and by the identity identification module cannot be directly compared, the rates of the two can be compared instead, and if the network rate of the data link corresponding to the second identity identification module is higher than that of the WiFi network, the data link of the second identity identification module is selected for service data transmission.

The above conditions may be used alone or in combination. For example, condition (1) may be selected first to determine that the communication quality is poor when the first identity identification module performs the communication service, and then condition (2) may be used to determine whether to use the data link corresponding to the second identity identification module as a substitute or auxiliary for transferring the service data of the communication service; or condition (1) may be selected first to determine that the communication quality is poor when the first identity identification module performs the communication service, and then condition (3) may be used to determine whether to use the data link corresponding to the second identity identification module or the WiFi link as a substitute or auxiliary for transferring the service data of the communication service; or condition (1) may be selected first to determine that the communication quality is poor when the first identity identification module performs the communication service, and then a combination of conditions (2) and (3) may be used to determine whether a substitute or auxiliary service data transmission mode should be enabled, and since the rate of the data link corresponding to the second identity identification module is higher than that of the WiFi link, the data link corresponding to the second identity identification module should be selected as the substitute or auxiliary for transferring the service data of the communication service.

After the data link corresponding to the second identity identification module is used to transmit the service data of the communication service, the communication quality may be monitored in real time, and if the communication quality remains poor for a period of time, it may be considered to switch transmission of the service data of the communication service back to the communication network corresponding to the first identity identification module. Therefore, as an exemplary embodiment, the transmission module 60 may be configured to perform the following operations after transmitting, through the data link corresponding to the second identity identification module, service data of the communication service performed by the first identity identification module.

Determining that a condition where the communication quality of the current communication service is lower than a second preset communication quality lasts for more than a preset period of time.

Switching back to a network link of the first identity identification module corresponding to the communication service to transmit the service data, or switching to a WiFi network to transmit the service data.

In practical applications, it is possible to determine whether the condition where the communication quality of the current communication service is lower than the second preset communication quality lasts for more than the preset period of time by determining a relationship between a specific parameter capable of representing the communication quality and a predetermined threshold corresponding to the parameter. Taking VoLTE as an example, it is considered that the quality of the VoLTE calling is significantly reduced when one or more of the following indexes satisfy the condition: 1. the received signal is below a threshold criterion; 2. the data rate is below a threshold criterion; 3. the packet loss rate is continuously higher than a threshold for a preset time; and 4. the RTP packet delay jitter value is continuously higher than a threshold for a preset time. The threshold value of each parameter corresponding to the second preset communication quality may be the same as or different from the threshold value of each parameter corresponding to the first preset communication quality.

It should be noted that each of the above modules may be implemented by software or hardware. For the latter, it may be implemented in, but not limited to, the following manner: all of the above modules are located in the same processor; or the above modules are located in different processors in any combination.

In an embodiment of the present disclosure, there is further provided a storage medium having a computer program stored thereon, in which the computer program is configured to be executed by a processor to cause steps of any one of the above method embodiments to be implemented.

In an embodiment, the storage medium may be configured to store a computer program for implementing the step of: transmitting, through a data link corresponding to the second identity identification module, service data of a communication service performed by the first identity identification module.

In an embodiment, the storage medium is further configured to store a computer program for implementing the step of: establishing a dedicated routing rule between the service port of the communication service and the device port of the data link corresponding to the second identity identification module in the terminal, The dedicated routing rule includes at least one of: the service data transmitted from the service port of the communication service is routed to the device port of the data link corresponding to the second identity identification module; and the service data, belonging to the communication service and received from the data link through the device port of the data link corresponding to the second identity identification module, is routed to the service port of the communication service.

In an embodiment, the storage medium may include, but not limited to: a U disk, a read-only memory (ROM), a random access memory (RAM), a mobile hard disk, a disk or optical disk, and other media that can store a computer program.

In an embodiment of the present disclosure, there is further provided an electronic apparatus, including a memory having a computer program stored thereon and a processor configured to execute the computer program to perform steps of any one of the above method embodiments.

In an embodiment, the electronic apparatus may further include a transmission device and an I/O device, in which the transmission device is coupled to the processor, and the I/O device is coupled to the processor.

In an embodiment, the processor may be configured to execute the following step with the computer program: transmitting, through a data link corresponding to the second identity identification module, service data of a communication service performed by the first identity identification module.

Specific examples in the present embodiment may refer to the examples described in the foregoing embodiments and alternative embodiments, which will not be repeated in the present embodiment.

Some application examples of the solution provided in the embodiments of the present disclosure are described below by taking a VoLTE service as an example.

A dual-VoLTE+dual-4G or dual-VoLTE+dual-5G smart terminal has the following characteristics: at the same time, a first card in the terminal can carry out VoLTE calling, while a second card still resides on the 4G or 5G network of another operator. With such a dual-card dual-standby terminal, when the VoLTE calling is carried out on the first card, a signal strength of the 4G or 5G network of the second card may be measured and a service link may be immediately activated, and the operator of the first card carrying out the VoLTE calling offers a WiFi calling function based on an S2b interface (non-trusted domain access Evolved Packet Core (EPC), which is 4G network communication core).

Figure 7:
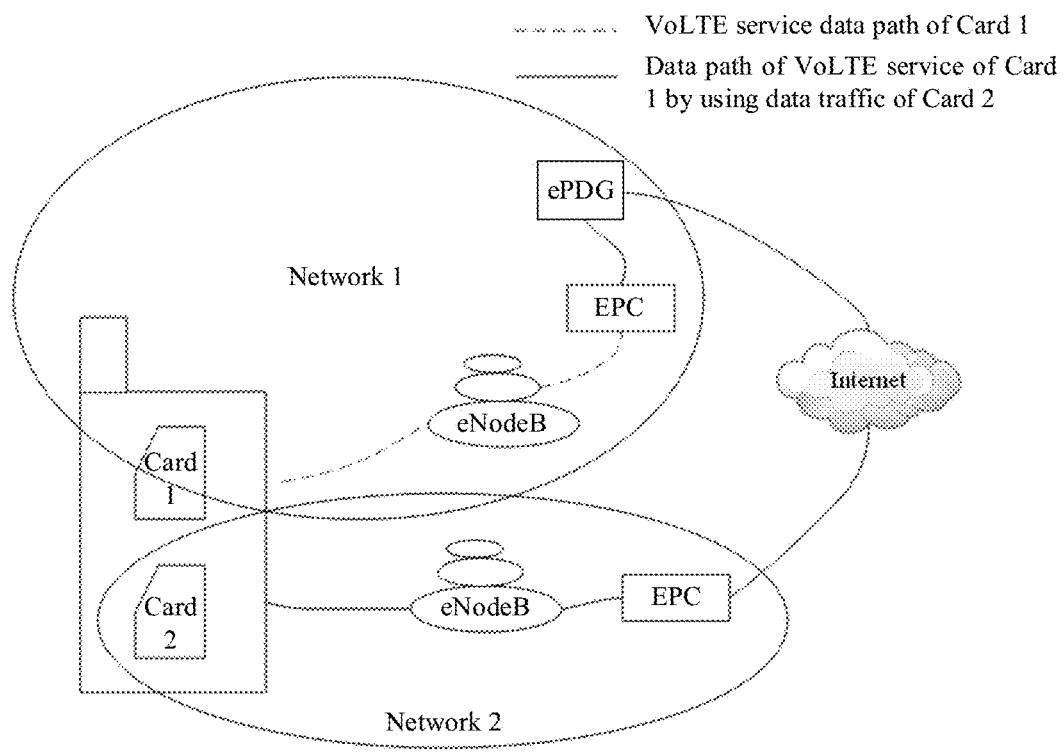
FIG. 7 is a network architecture and data flow diagram.

FIG. 7 is a network architecture and data flow diagram. Referring to FIG. 7, a basic method is briefly described as below.

A routing mechanism is established in the terminal, in which the VoLTE calling service of the first card (i.e., card 1 in FIG. 7) may use the data link of the second card (i.e., card 2 in FIG. 7). A module for monitoring a signal of the VoLTE calling service to the second card and for evaluating a rate and a packet loss rate of the data link is established in the terminal, and a module for monitoring a WiFi signal and for evaluating a rate and a packet loss rate of the WiFi data link is established in the terminal. The VoLTE calling quality of the terminal degrades when a signal or data rate of the operator network where the first card of the terminal is located degrades. At this time, if a WiFi module of the terminal is closed or the WiFi performance is not sufficient to support WFC, the terminal may immediately activate a 4G or 5G data link of the second card to establish a route in the terminal for the VoLTE service to take the 4G or 5G data link of the second card. The terminal accesses an ePDG (specifically, the ePDG in network 1 of FIG. 7) through the data link of the second card to establish an IPsec (IP Security) tunnel to an EPC (specifically, the EPC in network 1 of FIG. 7) in the network of the first card, performs IMS (IP Mutimedia Subsystem) registration based on an 802.11 network, and smoothly switches the current VoLTE calling to the second card. Referring to FIG. 7, it can be seen that in the method of the example, the path of data transmission through the data link of card 2 is significantly different from the original path of data transmission through the network of card 1.

In this solution, a dedicated network for the VoLTE service can be established in the terminal by establishing an internal route of the terminal, so that the VoLTE service may use the 4G or 5G data link of the second card, and thus the VoLTE service can be accessed to an ePDG of an operator by using the data link of the second card for the VoLTE calling, while since the VoLTE service uses the ePDG of the original operator to access to an EPC, no modification is required at the network side. Since the network side IMS service switching from LTE to the ePDG mode itself is a smooth switch without interruption, it is ensured that the user has no perception during switching of the VoLTE calling. Meanwhile, after the VoLTE calling of the first card is switched, it is not that the VoLTE service of the second card is started or activated, but a data link of the second card is utilized, so different operators do not need to sign any protocol or change any network element.

In this application example, two cases of application environment are involved.

Application Environment 1

The VoLTE calling of the terminal is carried out on any card (for convenience of description, assuming it is the first card, assumed as card 1), the network of card 1 is assumed as the network of operator 1, while the second card (for convenience of description, assumed as card 2) also resides on the 4G or 5G network of another operator, assumed as operator 2, and WiFi of the terminal is opened and the terminal is connected to a local WiFi network.

When the coverage capability or network resources of the network 1 where the terminal is currently located degrades, card 1 has a lower signal value or lower data rate, leading to significant reduced VoLTE calling quality. Meanwhile, the coverage capability or network capacity of the network 2 where card 2 is located is relatively good at the current position, the data link rate of card 2 is relatively fast and significantly faster than the rate of the WiFi network, thus the terminal immediately enables the solution described in this example to smoothly switch the VoLTE calling to the data link of card 2. If the rate of the WiFi network is faster than the rate of the data link of card 2, the VoLTE calling may be switched to WFC.

Application Environment 2

The VoLTE calling of the terminal is carried out on any card (for convenience of description, assuming it is the first card, assumed as card 1), the network of card 1 is assumed as the network of operator 1, while the second card (for convenience of description, assumed as card 2) also resides on the 4G or 5G network of another operator, assumed as operator 2, and WiFi of the terminal is closed, or although WiFi of the terminal is opened, the terminal is not connected to any WiFi network.

When the coverage capability or network resources of the network 1 where the terminal is currently located degrades, card 1 has a lower signal value or lower data rate, leading to significant reduced VoLTE calling quality. Meanwhile, the coverage capability or network capacity of the network 2 where card 2 is located is relatively good at the current position, When the signal of the network of card 2 is sufficient to support good VoLTE calling, the VoLTE calling on card 1 is switched to a VoLTE calling using the data link of card 2 by means of the solution in this example.

Figure 8:
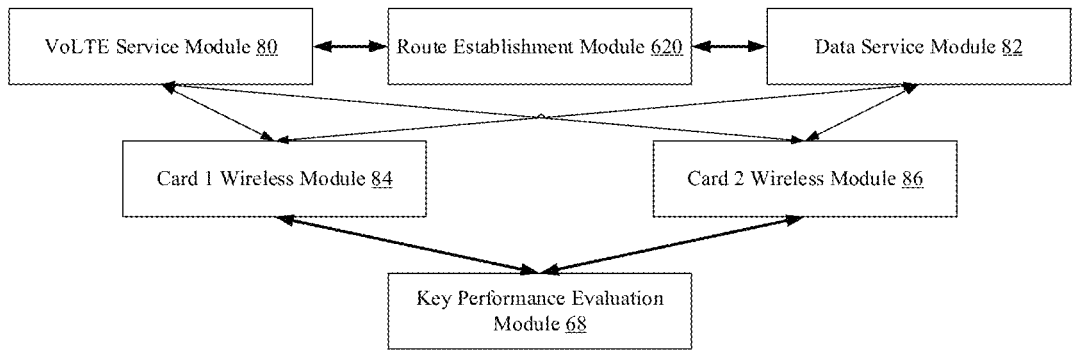
FIG. 8 is a schematic diagram of modules involved in a communication service transmission.

FIG. 8 is a schematic diagram of modules involved in a communication service transmission. As shown in FIG. 8, the route establishment module 620 and the key performance evaluation module 68 in the figure are new service modules in the terminal, and the thick connection line represents new control flows and data flows.

In FIG. 8, a VoLTE service module 80 is configured to implement a VoLTE service; a data service module 82 is configured to implement network access through a data link; and a card 1 wireless module 84 and a card 2 wireless module 86, corresponding to card 1 and card 2 respectively, are modules configured to implement wireless communication.

The route establishment module 620 and the key performance evaluation module 68 are not limited to software or hardware implementations.

The route establishment module 620 has a function of: establishing a dedicated route from the VoLTE service module (the service port of the communication service thereon is used as an input/output port of the module) to the device port of the data link of the second card, so that the data service of the second card can be used for the current VoLTE calling without changing the card to which the service belongs.

The key performance evaluation module 68 has a function of: evaluating key indexes such as signal strength, data rates and the like of card 1 and card 2 based on the network signals in real time to determine whether to perform service switching, in which evaluation of a WiFi network may be added.

The method flow and implementation steps of the solution in this example are described below by taking the above application environment 1 and application environment 2 as examples.

For the application environment 1, the communication service transmission method in this example includes the following steps 1 to 7.

At step 1, the VoLTE calling quality performed on card 1 degrades, and at the same time, the key performance evaluation module 68 has monitored that the wireless network signal of card 1 degrades, and the Reference Signal Receiving Power (RSRP) of the network of card 1 is lower than a preset threshold M (which may be preconfigured by the manufacturer, for example, −105 dBm), while the wireless network signal of card 2 is better and the RSRP thereof is higher than the value M, and the WiFi network signal is better and the Received Signal Strength Indicator (RSSI) thereof is higher than a preset threshold N (which may be preconfigured by the manufacturer, for example, −75 dBm), so the VoLTE service may be performed on the WiFi since the WiFi signal strength is higher than the threshold identification.

At step 2, the key performance evaluation module 68 evaluates and compares the wireless data performances of card 1, card 2 and WiFi. Comparison factors for performances of card 1 and card 2 include, but not limited to, a data transmission rate, a packet loss rate, an error rate, and an RTP packet delay jitter value. Comparison factors for performances of card 1/card 2 and WiFi include, but not limited to, a network rate.

At step 3, the key performance evaluation module 68 evaluates and determines that card 2 has the best wireless data performance, so the data network of card 2 is marked as a destination switching network. Then, the internet data connection of card 2 is activated and a virtual device port rmnet2 for data connection of card 2 (corresponding to the aforementioned device port of the data link corresponding to the second identity identification module, assumed as "rmnet2" in this example) is established, while a network assigned address, a gateway address, and a DNS server address of the data connection are notified to the route establishment module 620.

At step 4, the route establishment module 620 establishes a dedicated route for the VoLTE service, and a rule of the dedicated routing includes: 1) establishing a data forwarding rule from the VoLTE service port to the data connection device port rmnet2 of card 2, operating Dynamic Host Configuration Protocol (DHCP) or an IP address allocation protocol to allocate an internal IP address and a port number to a VoLTE service or a program, where for an internal local area network, each application is a client, a unique port thereof in the internal local area network and the IP address allocated to a mobile phone by the internal local area network form an address of the application, i.e., an IP address+a port, for example, an address used by an application 1 in the mobile phone is 192.168.0.1: 01, where 01 is a port, and an address used by an application 2 is 192.168.0.1: 02, where 02 is a port; 2) establishing a dedicated routing rule, allowing all data sent from the VoLTE service module, and data packets (all data of the VoLTE calling service) with original addresses and port numbers being exclusive to the VoLTE service and program, to be sent to the Internet through the rmnet2 port; 3) establishing a dedicated routing rule, and forwarding all data packets from the network received by the rmnet2 port, whose destination address port numbers are the VoLTE service module, to the VoLTE service module or program; the method for establishing the dedicated routing rule may include, but not limited to, the following method.

1. using a routing table numbered "X" for all data packets from the VoLTE service module;
2. adding the following route to the routing table "X" under the assumption that the data service interface of card 2 is rmnet2: all data packets to the VoLTE service module go out through the rmnet2 interface;
3. establishing a virtual port volte1 for the VoLTE service module, allowing the established data to be forwarded, in which a virtual device number is allocated to the application port to facilitate the establishment of end-to-end routing;
4. rejecting invalid data packets to be forwarded from the data service interface of card 2 to the VoLTE service module interface, in which all data packets of non-VoLTE services are rejected, and other data packets may go through other routes; and
5. allowing forwarding from the data service interface of card 2 to the VoLTE service module interface.

At this time, the terminal is internally provided with a routing table that provides a dedicated route for the VoLTE service or application, so that the VoLTE service or application can be connected to the Internet through the data link of card 2, as if the VoLTE service or application accesses a WLAN network. By establishing a route with software, the data link of a card belonging to a second operator is shared, which, like a WiFi hotspot function on the mobile phone, creates a hotspot to share its own data service, but differs from the WiFi hotspot sharing mode in that: traffic of card 2 is only shared for the VoLTE service of card 1; and no WiFi hardware is required for transmission. That is, an end-to-end, VoLTE service of card 1 to data link of card 2 software routing path is created, and for the VoLTE application of card 1, it is connected to an S2b WiFi hotspot.

At step 5, the route establishment module 620 sends a notification that WLAN is connected to the VoLTE service module, and notifies the VoLTE service module of the IP address and virtual gateway allocated to the VoLTE service module by the virtual WLAN network, so that the VoLTE service module may use the WLAN to connect to the Internet, as if connecting to a WLAN hotspot outside the terminal.

At step 6, at this time, the VoLTE service module is connected to the Internet through the data link of card 2, and as shown in FIG. 7, the VoLTE service module initiates URL address resolution of the ePDG of the network 1 to which card 1 belongs on the data link of card 2 to obtain an IP address of the ePDG.

At step 7, the VoLTE service module initiates an end-to-end IKEv2/EAP-AKA procedure to the IP address of the ePDG of the network 1 to which card 1 belongs, and after success, a GTP tunnel is established between the ePDG and the PGW of the network of card 1, the PGW of the network of card 1 allocates a remote IP address and a P-CSCF address to the ePDG through GTP, the ePDG sends the address to the terminal which sends a re-invite message to smoothly switch the current VoLTE service to an "internal virtual WLAN connection", that is, the data link of card 2.

For the application environment 2, the communication service transmission method in this example includes the following steps 1 to 7.

At step 1, the VoLTE calling quality performed on card 1 degrades, and at the same time, the key performance evaluation module 68 has monitored that the wireless network signal of card 1 degrades, and the Reference Signal Receiving Power (RSRP) of the network of card 1 is lower than a preset threshold M (which may be preconfigured by the manufacturer, for example, −105 dBm), while the wireless network signal of card 2 is better and the RSRP thereof is higher than the value M.

At step 2, the key performance evaluation module 68 evaluates and compares the wireless data performances of card 1 and card 2. Comparison factors for performances of card 1 and card 2 include, but not limited to, a data transmission rate, a packet loss rate, an error rate, and an RTP packet delay jitter value. If the current network data performance of card 2 is superior, the subsequent steps are performed.

At step 3, the key performance evaluation module 68 evaluates and determines that card 2 has better wireless data performance, so the data network of card 2 is marked as a destination switching network. Then, the internet data connection of card 2 is activated and a virtual device port rmnet2 for data connection of card 2 (assumed as rmnet2) is established, while a network assigned address, a gateway address, and a DNS server address of the data connection are notified to the route establishment module 620.

The subsequent steps 4 to 7 are the same as in the example of the application environment 1 described above.

Figure 9A:
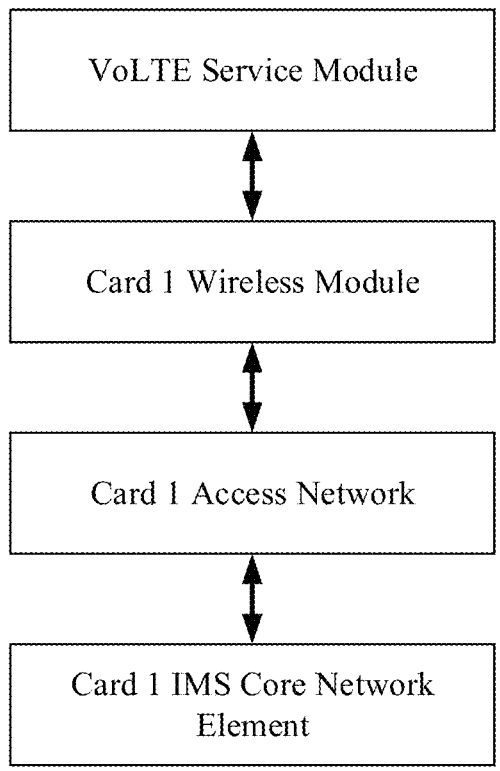
FIG. 9A is a schematic diagram showing a transmission path of a communication service flow before establishing a route.
Figure 9B:
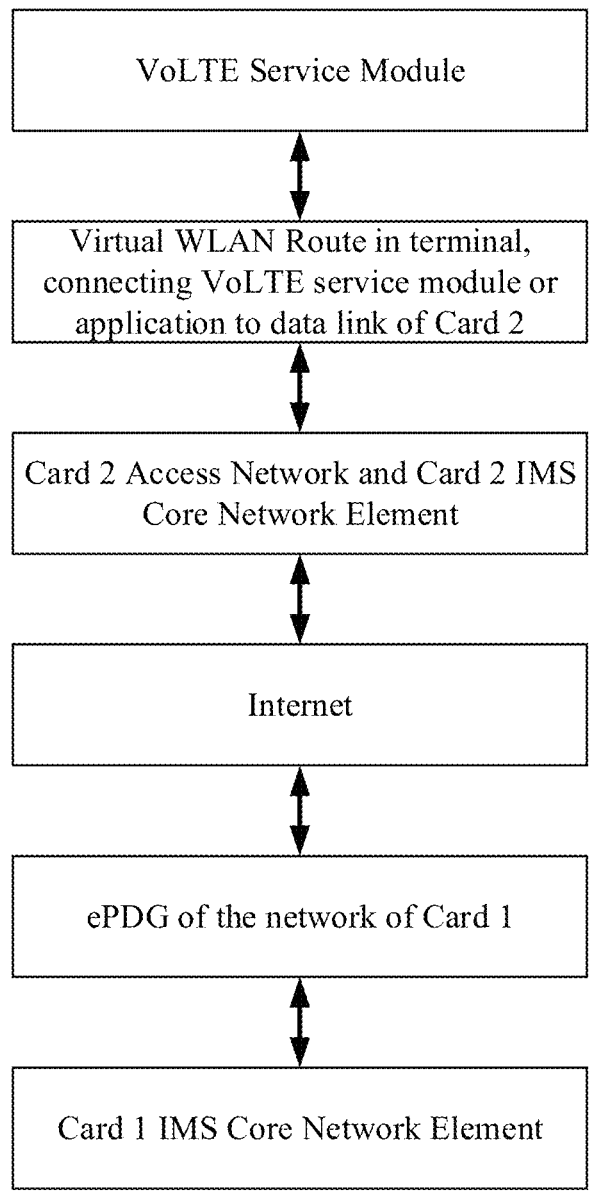
FIG. 9B is a schematic diagram showing a transmission path of a communication service flow after establishing a route.

FIGS. 9A and 9B are schematic diagrams showing a comparison of communication service flows before and after establishing a route, FIG. 9A is a schematic diagram showing a transmission path of a communication service flow before establishing a route; and FIG. 9B is a schematic diagram showing a transmission path of a communication service flow after establishing a route.

As shown in FIG. 9A, before the route is established, when sending a service, the VoLTE service data, after being output from the VoLTE service module, enters an access network of card 1 through a wireless module of card 1, and then is transferred to an IMS core network element of card 1; and when receiving a service, the VoLTE service data, after being sent from IMS core network element of card 1, reaches the wireless module of card 1 through the access network of card 1, and finally enters the VoLTE service module.

As shown in FIG. 9B, after the route is established, when sending a service, the VoLTE service data, after being output from the VoLTE service module, reaches the data link of card 2 through the virtual WLAN route in the terminal, and then reaches the ePDG of the network to which card 1 belongs through an access network and core network gateway of card 2 and the Internet, before being sent to the IMS core network element of card 1 by the ePDG; and when receiving a service, the VoLTE service data, after being sent from the IMS core network element of card 1, reaches the ePDG of the network to which card 1 belongs, and then is transmitted to the core network gateway of card 2 through the Internet and further reaches the access network of card 2, before reaching the inside of the terminal and being forwarded to the VoLTE service module through the virtual WLAN route in the terminal.

According to the solution provided in the embodiment of the disclosure, the quality and stability of the VoLTE calling (voice+video) and RCS services are improved locally at the terminal with the minimum cost, the maximum utilization rate of a dual-VoLTE+dual-4G or dual-VoLTE+dual-5G smart terminal to wireless networks of different network operators and local WiFi networks is increased, and the user experience is notably improved.

The solutions provided in the embodiments of the disclosure do not need any change at the network side, can obviously improve the performance of the VoLTE calling from merely the terminal side, and can be completely implemented with a full software solution, thus realizing the lowest cost.

Obviously, a person skilled in the art would understand that the above modules and steps of the present disclosure may be realized by using a universal computing device, may be integrated in a single computing device or distributed on a network that consists of a plurality of computing devices; and alternatively, they may be realized by using the executable program code of the computing device, so that they may be stored in a storage device and executed by the computing device, and in some embodiments, may perform the shown or described steps in a sequence other than herein, or they may be made into various integrated circuit modules respectively, or a plurality of modules or steps thereof may be made into a single integrated circuit module, thus to be realized.

The descriptions above are only embodiments of the present disclosure, which are not intended to restrict the present disclosure. For those skilled in the art, the present disclosure may have various changes and variations. Any amendments, equivalent substitutions, improvements, etc. within the principle of the disclosure are all included in the scope of the protection defined by the appended claims of the disclosure.

What is claimed is:

1. A communication service transmission method, which is applicable to a terminal comprising a plurality of identity identification modules and a plurality of transmission devices, the plurality of identity identification modules comprising a first identity identification module and a second identity identification module, the plurality of transmission devices comprising a first transmission device corresponding to the first identity identification module and a second transmission device corresponding to the second identity identification module, and the method comprising:

transmitting, through a data link corresponding to the second identity identification module, service data of a communication service performed by the first identity identification module, wherein before the step of transmitting, through the data link corresponding to the second identity identification module, service data of the communication service performed by the first identity identification module, the method further comprises:

establishing an internal local area network in the terminal, wherein the internal local area network is configured to transmit the service data between a service port of the communication service and a device port of the data link corresponding to the second identity identification module in the terminal.

2. The method according to claim 1, wherein the step of establishing the internal local area network in the terminal comprises:

establishing a dedicated routing rule between the service port of the communication service and the device port of the data link corresponding to the second identity identification module in the terminal, wherein the dedicated routing rule comprises at least one of:

the service data transmitted from the service port of the communication service is routed to the device port of the data link corresponding to the second identity identification module; and the service data, belonging to the communication service and received from the data link through the device port of the data link corresponding to the second identity identification module, is routed to the service port of the communication service.

3. The method according to claim 2, wherein the internal local area network, based on the dedicated routing rule, transmits the service data between the service port of the communication service and the device port of the data link corresponding to the second identity identification module in the terminal.

4. The method according to claim 1, wherein the step of transmitting, through the data link corresponding to the second identity identification module, service data of the communication service performed by the first identity identification module comprises at least one of:

- transmitting the service data transmitted from the service port of the communication service to the device port of the data link corresponding to the second identity identification module over the internal local area network, and sending, through the data link at the device port, the service data to a core network element for implementing the communication service in a first network corresponding to the first identity identification module; and
- receiving, at the device port of the data link corresponding to the second identity identification module, the service data sent from the core network element for implementing the communication service in the first network corresponding to the first identity identification module through the data link, and transmitting the service data from the device port to the service port of the communication service over the internal local area network.

5. The method according to claim 4, wherein the step of sending, through the data link at the device port, the service data to the core network element for implementing the communication service in the first network corresponding to the first identity identification module comprises:

sending, at the device port, a first data packet through the data link corresponding to the second identity identification module, wherein the first data packet carries the service data, and a destination address of the first data packet is configured as an address of the core network element.

6. The method according to claim 5, wherein before the step of sending, at the device port, the first data packet through the data link corresponding to the second identity identification module, the step of sending, through the data link at the device port, the service data to the core network element for implementing the communication service in the first network corresponding to the first identity identification module further comprises:

replacing a source address of the first data packet being an address allocated by the internal local area network to the communication service performed by the first identity identification module with an address allocated by the first network to the communication service performed by the first identity identification module.

7. The method according to claim 4, wherein the step of sending, through the data link at the device port, the service data to the core network element for implementing the communication service in the first network corresponding to the first identity identification module comprises:

sending, at the device port, a second data packet through the data link corresponding to the second identity identification module, wherein the second data packet carries the service data, and a destination address of the second data packet is configured as an address of a pre-gateway of the core network element in the first network; and establishing, after the pre-gateway receives the second data packet, a tunnel between the pre-gateway and the core network element, through which the second data packet is sent to the core network element.

8. The method according to claim 7, wherein before the step of sending, at the device port, the second data packet through the data link corresponding to the second identity identification module, the step of sending, through the data link at the device port, the service data to the core network element for implementing the communication service in the first network corresponding to the first identity identification module further comprises:

replacing a source address of the second data packet being an address allocated by the internal local area network to the communication service performed by the first identity identification module with an address allocated by the first network to the communication service performed by the first identity identification module.

9. The method according to claim 4, wherein the step of receiving, at the device port of the data link corresponding to the second identity identification module, the service data sent from the core network element for implementing the communication service in the first network corresponding to the first identity identification module through the data link comprises:

receiving, at the device port, a third data packet sent from the core network element for implementing the communication service in the first network through the data link, wherein the third data packet carries the service data, and a destination address of the third data packet is an address allocated by the first network to the communication service performed by the first identity identification module.

10. The method according to claim 9, wherein after the step of receiving, at the device port, the third data packet sent from the core network element for implementing the communication service in the first network through the data link, the step of receiving, at the device port of the data link corresponding to the second identity identification module, the service data sent from the core network element for implementing the communication service in the first network corresponding to the first identity identification module through the data link further comprises:

replacing the destination address of the third data packet being the address allocated by the first network to the communication service performed by the first identity identification module with an address allocated by the internal local area network to the communication service performed by the first identity identification module.

11. The method according to claim 1, wherein before the step of transmitting, through the data link corresponding to the second identity identification module, service data of the communication service performed by the first identity identification module, the method further comprises at least one of:

activating connection to the data link corresponding to the second identity identification module; and establishing a device port of the data link corresponding to the second identity identification module.

12. The method according to claim 1, wherein the step of transmitting, through the data link corresponding to the second identity identification module, service data of the communication service performed by the first identity identification module is performed in response to a predetermined condition is satisfied, wherein the predetermined condition comprises at least one of:

a communication quality of the communication service performed by the first identity identification module is lower than a first preset communication quality;

a signal quality of the second identity identification module is higher than that of the first identity identification module; and a network rate of the data link corresponding to the second identity identification module is higher than that of a WiFi network.

13. The method according to claim 1, wherein after the step of transmitting, through the data link corresponding to the second identity identification module, service data of the communication service performed by the first identity identification module, the method further comprises:

- determining that a condition where the communication quality of the current communication service is lower than a second preset communication quality lasts for more than a preset period of time; and
- switching back to a network link of the first identity identification module corresponding to the communication service to transmit the service data, or switching to a WiFi network to transmit the service data.

14. The method according to claim 1, wherein the communication service is a communication service related to the first identity identification module.

15. A non-transitory computer-readable storage medium having a computer program stored thereon, wherein the computer program is configured to be executed by a processor to cause the method of claim 1 to be implemented.

16. An electronic apparatus, comprising a memory having a computer program stored thereon and a processor configured to execute the computer program to perform the method of claim 1.

17. A communication service transmission apparatus, which is applicable to a terminal comprising a plurality of identity identification modules and a plurality of transmission devices, the plurality of identity identification modules comprising a first identity identification module and a second identity identification module, the plurality of transmission devices comprising a first transmission device corresponding to the first identity identification module and a second transmission device corresponding to the second identity identification module, and the apparatus comprising:

- a transmission module configured to transmit service data of a communication service performed by the first identity identification module through a data link corresponding to the second identity identification module; and
- an internal local area network establishment module configured to establish an internal local area network in the terminal, wherein the internal local area network is configured to transmit the service data between a service port of the communication service and a device port of the data link corresponding to the second identity identification module in the terminal.

18. The device according to claim 17, wherein the internal local area network establishment module comprises:

- a route establishment module configured to establish a dedicated routing rule between the service port of the communication service and the device port of the data link corresponding to the second identity identification module in the terminal, wherein the dedicated routing rule comprises at least one of:
- the service data transmitted from the service port of the communication service is routed to the device port of the data link corresponding to the second identity identification module; and
- the service data, belonging to the communication service and received from the data link through the device port of the data link corresponding to the second identity identification module, is routed to the service port of the communication service.

* * * * *